(12) United States Patent
Chen (10) Patent No.: US 10,345,638 B2
(45) Date of Patent: Jul. 9, 2019

(54) DISPLAY PANEL AND DISPLAY DEVICE (71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/750,181

(22) PCT Filed: Jan. 4, 2018

(86) PCT No.: PCT/CN2018/071457
§ 371 (c)(1),
(2) Date: Feb. 3, 2018

(87) PCT Pub. No.: WO2019/024435
PCT Pub. Date: Feb. 7, 2019

(65) Prior Publication Data
US 2019/0041691 A1 Feb. 7, 2019

(51) Int. Cl.
*G02F 1/1335* (2006.01)
*G02F 1/1362* (2006.01)
*G02F 1/135* (2006.01)

(52) U.S. Cl.
CPC .. *G02F 1/133512* (2013.01); *G02F 1/133514* (2013.01); *G02F 1/136209* (2013.01);
(Continued)

(58) Field of Classification Search
CPC ......... G02F 1/136209; G02F 1/133512; G02F 1/133514; G02F 2001/136218; G02F 2001/1351; G02F 1/136286
See application file for complete search history.

(56) References Cited

U.S. PATENT DOCUMENTS

2010/0182549 A1* 7/2010 Miyashita ......... G02F 1/133514
349/106
2012/0287605 A1 11/2012 Chen
(Continued)

FOREIGN PATENT DOCUMENTS

CN 104698674 A 6/2015
CN 106371242 A 2/2017
(Continued)

*Primary Examiner* — Jia X Pan
(74) *Attorney, Agent, or Firm* — Andrew C. Cheng (57) ABSTRACT

A display panel includes a liquid crystal layer arranged between first and second substrates. The first substrate includes, consecutively connected, a first light transmission zone, a first light blocking zone, and a second light transmission zone. The second substrate includes, consecutively connected, a third light transmission zone, a second light blocking zone, and a fourth light transmission zone. A projection of the first light blocking zone cast on the second substrate has an area covering the second light blocking zone. The first light blocking zone functions to block, when first light is projected onto the first light transmission zone, the first light from projecting onto the second light transmission zone, and the second light blocking zone functions to block, when second light is projecting onto the third light transmission zone, the second light from projecting onto the fourth light transmission zone. A display device is also provided.

9 Claims, 4 Drawing Sheets (52) U.S. Cl.
CPC ........... *G02F 1/136286* (2013.01); *G02F 2001/1351* (2013.01); *G02F 2001/136218* (2013.01)

(56) References Cited

U.S. PATENT DOCUMENTS

| | | | | |
|---|---|---|---|---|
| 2012/0327340 | A1* | 12/2012 | Ochiai | G02F 1/133512 349/108 |
| 2013/0077008 | A1* | 3/2013 | Kim | G02F 1/136227 349/42 |
| 2015/0170605 | A1* | 6/2015 | Watakabe | G02F 1/133514 345/600 |
| 2016/0342048 | A1* | 11/2016 | Huang | H01L 23/552 |
| 2017/0168347 | A1* | 6/2017 | Li | G02F 1/133345 |

FOREIGN PATENT DOCUMENTS

| | | |
|---|---|---|
| CN | 106773379 A | 5/2017 |
| CN | 107219674 A | 9/2017 |
| JP | 2015069119 A | 4/2015 |

\* cited by examiner

DISPLAY PANEL AND DISPLAY DEVICE

CROSS REFERENCE TO RELATED APPLICATIONS

This application claims the priority of Chinese Patent Application No. 2017106473676 filed on Aug. 1, 2017, titled "Display Panel and Display Device", the disclosure of which is incorporated herein by reference in its entirety.

BACKGROUND OF THE INVENTION

1. Field of the Invention

The present invention relates to the field of liquid crystal display technology, and more particularly to a display panel and a display device having the display panel.

2. The Related Arts

In a traditional display panel, upper and lower polarizers are often provided on two opposite sides of a color filter layer for forming, in combination with liquid crystal optics, a color luminous panel. In new technical development, it is necessary to place a polarization structure between the color filter layer and a liquid crystal layer. This is done for the consideration of two situations: (1) The color filter layer is generally made up of components including pigment and tiny particles of the pigments cause, to some extents, depolarization for a polarization state of polarized light. Such a mechanism leads to lowering of contrast of the entire display panel so that it is necessary to place the polarization structure between the color filter layer and the liquid crystal layer. (2) In making a display panel having a quantum-dot color filter layer, since the mechanism of coloring generated by a quantum dot material is electroluminescence, the propagation of polarized light of a liquid crystal display would be affected, so that arranging a polarization device between the quantum-dot color filter layer and the liquid crystal layer would help prevent influence caused by polarized light being converted into partly polarized light as passing through the quantum-dot color filter layer.

In a known structure, the size of a color sub-pixel is relatively large, as compared to the thickness of a liquid crystal cell, so that it is only when incident light is approaching in a direction close to the horizontal direction that a situation that exit light deviates from a corresponding color sub-pixel may occur. However, arranging a polarization structure or other functional layers between the color filter layer and the liquid crystal layer would increase a spacing distance between the color filter layer and a thin-film transistor (TFT) layer and thus, incident light having an incident angle that is greater than 14.59° would deviate from an area of a normally corresponding color sub-pixel. This would result in majority of the incident light deviating from the area of the corresponding color sub-pixel and projecting toward other areas of adjacent sub-pixels, leading to cross-talking of light among the sub-pixel areas and causing abnormal displaying of images.

SUMMARY OF THE INVENTION

In view of the above problem, an object of this application is to provide a display panel and a display device that overcome the issue of cross-talking of light amount sub-pixel areas of a color filter layer.

In order to overcome the deficiencies existing in the background art, in one aspect, this application provides a display panel, which comprises a liquid crystal layer, a first substrate, and a second substrate, wherein the liquid crystal layer is arranged between the first substrate and the second substrate; the first substrate comprises, consecutively connected, a first light transmission zone, a first light blocking zone, and a second light transmission zone; the second substrate comprises, consecutively connected, a third light transmission zone, a second light blocking zone, and a fourth light transmission zone; the first light transmission zone and the third light transmission zone are arranged opposite to each other; the first light blocking zone and the second light blocking zone are arranged opposite to each other and a projection of the first light blocking zone cast on the second substrate has an area covering the second light blocking zone; the first light blocking zone functions to block, when first light is projected onto the first light transmission zone, the first light from projecting onto the second light transmission zone, and the second light blocking zone functions to block, when second light is projecting onto the third light transmission zone, the second light from projecting onto the fourth light transmission zone.

In the above, the first light blocking zone and the first light transmission zone have an interfacing line therebetween that defines a first border, and the second light blocking zone and the fourth light transmission zone have an interfacing line therebetween that defines a second border, a connection line between the first border and the second border and the first substrate defining therebetween an angle that is smaller than or equal to 79°.

In the above, the first light transmission zone, the first light blocking zone, and the second light transmission zone are arranged to distribute in a first direction, the first light blocking zone having a length in the first direction that is a first length, the second light blocking zone having a length in the first direction that is a second length, a ratio between the first length and the second length being between 3:1 and 6:1.

In the above, the first substrate is parallel to the second substrate or defines an angle that is smaller than or equal to 5° with respect to the second substrate.

In the above, the first substrate comprises a thin-film transistor layer and the second substrate comprises a color filter substrate, the display substrate further comprising a backlight source, the backlight source being arranged at one side of the thin-film transistor layer that is distant from the color filter substrate, the backlight source emitting first light transmitting through the first light transmission zone to project onto the third light transmission zone.

In the above, the first light blocking zone comprises first metal wiring zones and a third light blocking zone, the third light blocking zone being arranged between the first metal wiring zone and the first light transmission zone and between the first metal wiring zone and the second light transmission zone.

In the above, the third light blocking zone is formed of a material that is the same as a material of the second light blocking zone.

In the above, the first substrate comprises a color filter substrate and the second substrate comprises a thin-film transistor layer, the display substrate further comprising a backlight source, the backlight source being arranged at one side of the thin-film transistor layer that is distant from the color filter substrate, the backlight source emitting second light transmitting through the second light transmission zone to project onto the first light transmission zone.

In the above, the second light blocking zone comprises a second metal wiring zone, a projection of the first light blocking zone cast on the second substrate having an area covering the second metal wiring zone.

In another aspect, the present invention provides a display device, which comprises a display panel. The display panel comprises a liquid crystal layer, a first substrate, and a second substrate, wherein the liquid crystal layer is arranged between the first substrate and the second substrate; the first substrate comprises, consecutively connected, a first light transmission zone, a first light blocking zone, and a second light transmission zone; the second substrate comprises, consecutively connected, a third light transmission zone, a second light blocking zone, and a fourth light transmission zone; the first light transmission zone and the third light transmission zone are arranged opposite to each other; the first light blocking zone and the second light blocking zone are arranged opposite to each other and a projection of the first light blocking zone cast on the second substrate has an area covering the second light blocking zone; the first light blocking zone functions to block, when first light is projected onto the first light transmission zone, the first light from projecting onto the second light transmission zone, and the second light blocking zone functions to block, when second light is projecting onto the third light transmission zone, the second light from projecting onto the fourth light transmission zone.

Compared to the prior art, this application provides a display panel, which possesses at least the following advantages:

The display panel is structured to reduce the size of the light transmission zone of the thin-film transistor layer or to increase the size of the light blocking zone of the color filter substrate in order to reduce issues of abnormality of image displaying caused by deviation of light from a corresponding color resist sub-pixel area, or even projection onto other color resist sub-pixel areas adjacent thereto, at the time when light transmits from the light transmission zone of the thin-film transistor layer to get incident onto the color filter substrate.

BRIEF DESCRIPTION OF THE DRAWINGS

To more clearly explain the technical solution proposed in embodiments of this application, a brief description of the drawings that are necessary for describing the embodiments will be given as follows. It is obvious that the drawings that will be described below show only some embodiments of this application. For those having ordinary skills of the art, other drawings may be readily available from these attached drawings without the expense of creative effort and endeavor.

DETAILED DESCRIPTION OF THE PREFERRED EMBODIMENTS

A clear and complete description will be given to technical solutions provided in embodiments of this application with reference to the attached drawings of the embodiments of this application.

The embodiment of this application provides a display device. The display device can be an electronic device that includes a display panel, such as a liquid crystal television, a mobile phone, a personal digital assistant (PDA), a digital camera, a computer display, or a screen of a notebook computer.

A vertically aligned mode liquid crystal display (VA-LCD) will be taken as an example in this application. When a proper driving voltage signal is supplied to a thin-film transistor (TFT) layer side, liquid crystal molecules are caused to rotate by 90 degrees. This is just like opening a light transmission window, which is opposite to and has a similar size with a color resist sub-pixel area, on one side of the TFT layer that faces a color filter (CF) substrate so that light may transmit through the light transmission window to enter the liquid crystal layer and projecting onto the color resist sub-pixel area (such as red, green, or blue (R/G/B) color resist sub-pixel area) to display a color. During displaying of an image having the greatest brightness, below the patterned CF substrate, an area of an incident window through which light passes is close to the area and size of a color resist sub-pixel area.

Figure 1:
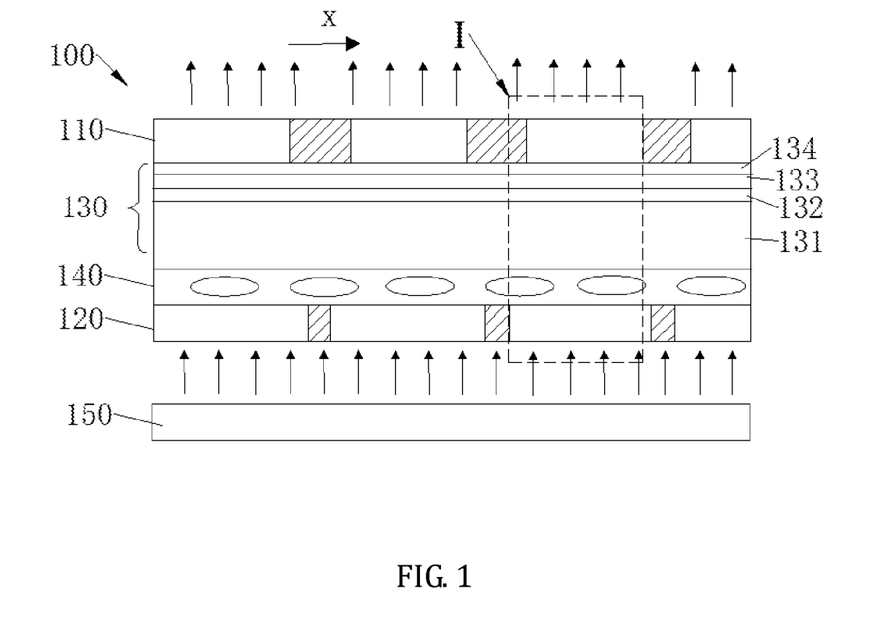
FIG. 1 is a schematic view illustrating a structure of a display panel provided in an embodiment of this application.

In an embodiment, referring to FIG. 1, a display device comprises a display panel 100. The display panel 100 comprises a first substrate 110, a second substrate 120, an upper substrate 130, a liquid crystal layer 140, and a backlight source 150. The upper substrate 130 and the liquid crystal layer 140 are arranged between the first substrate 110 and the second substrate 120. In the instant embodiment, the first substrate 110 can be a color filter substrate and the second substrate 120 is thin-film transistor layer, or alternatively, the first substrate 110 can be a thin-film transistor layer and the second substrate 120 is a color filter substrate. The upper substrate 130 is arranged between the liquid crystal layer 140 and the color filter substrate. The upper substrate 130 may comprise a glass plate 131, a transparent conductive film layer 132, a polarization layer 133, and a planarization layer 134, and locations of these layers of the upper substrate 130 are not subjected to any specific arrangement and may be simply arranged in the way shown in FIG. 1. The polarization layer 133 may be arranged on a side of the color filter substrate that is distant from the thin-film transistor layer and this application does not constrains the location of the polarization layer 133.

In the instant embodiment, referring to FIG. 1, an example that the first substrate 110 is a color filter substrate and the second substrate 120 is a thin-film transistor layer is provided. Arranging the polarization layer 133 between the color filter substrate 110 and the liquid crystal layer 140 would provide the following advantages: On the one hand, the color filter substrate 110 is generally made up components including pigments and the pigment, which is generally tiny particles, would cause certain degrees of depolarization on a polarization state of polarized light. Such a mechanism causes lowering of contrast of the entire display panel 100. Thus, under certain conditions, arranging the polarization layer 133 between the color filter substrate 110 and the liquid crystal layer 140 would help reduce the effect of depolarization on the polarization state of the polarized light by the color filter substrate 110. On the other hand, in the fabrication of a display panel 100 that comprises a quantum-dot color filter substrate, since the mechanism that a quantum dot material generates a color is based on electroluminescence, the transmission of polarized light of the display panel 100 would be influenced. Placing the polarization layer 13 between the quantum-dot color filter substrate and the liquid crystal layer 140 would help prevent influence of displaying caused by the situation that the polarized light is converted into partly polarized light after passing through the quantum-dot color filter substrate.

Figure 2:
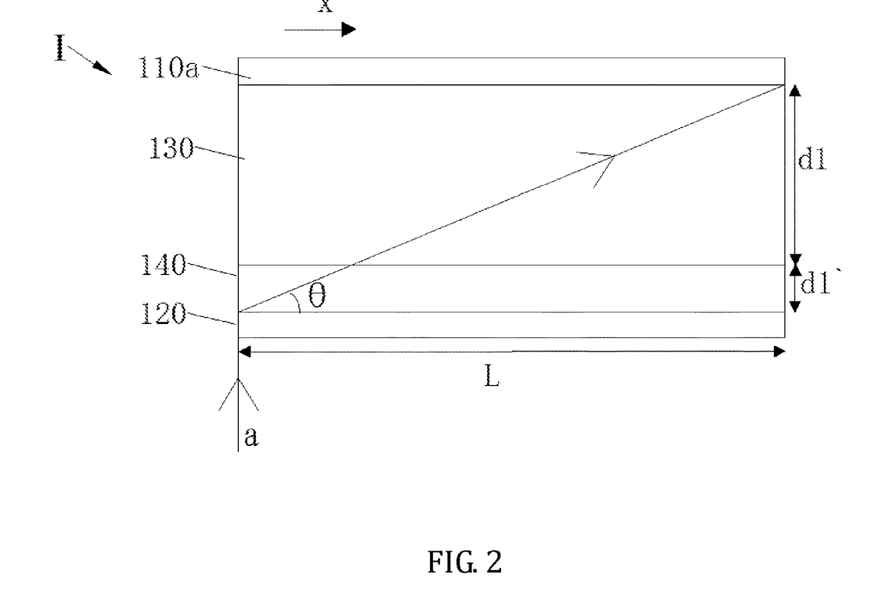
FIG. 2 is a schematic view illustrating a optical path provided in an embodiment of this application.

Referring to FIGS. 1 and 2, by arranging the polarization layer 133 between the color filter substrate 110 and the liquid crystal layer 140 (which is referred to as "externalized color filter substrate"), light that travels from the thin-film transistor layer 120 to get incident onto the color filter substrate 110 would have an incident angle $90°-\theta=\arctan((d1+d1')/L)$, wherein d1 is a spacing distance between the liquid crystal layer 140 and the color filter substrate 110. Since those components, such as the glass plate 131 and the polarization layer 133, are arranged between the liquid crystal layer 140 and the color filter substrate 110, d1 is greater than 400 μm. d1' designates a thickness of the liquid crystal layer 140 and d1' is around 3.5 μm. For a color resist sub-pixel having a length of 315 μm and a width of 105 μm, L is the width of the color resist sub-pixel of the color filter substrate 110 and then, L is 105 μm. For the incidence angle of the light a being $90°-\theta=\arctan(403.5/105)=14.59°$, this implies that incident light having an incidence angle greater than 14.59° would deviate from a color resist sub-pixel area 110a that normally corresponds. This results in majority of the incident light deviating from the corresponding color resist sub-pixel area 110a, and even projecting to other color resist sub-pixel areas adjacent thereto and leading to abnormality of a displayed image.

To resolve the above issues, an attempt can be made to decrease d1, namely decreasing a spacing distance between the liquid crystal layer 140 and the color filter substrate 110, by using an ultra-thin upper substrate 130, such as a polyimide (PI) based flexible plate, so that the influence on the incident angle by the externalized color filter substrate 110 can be reduced. Further, an embodiment of this application also provides the following example embodiments in which a critical angle at which the incident light deviates from the normally corresponding color resist sub-pixel area is increased by increasing L.

Figure 3:
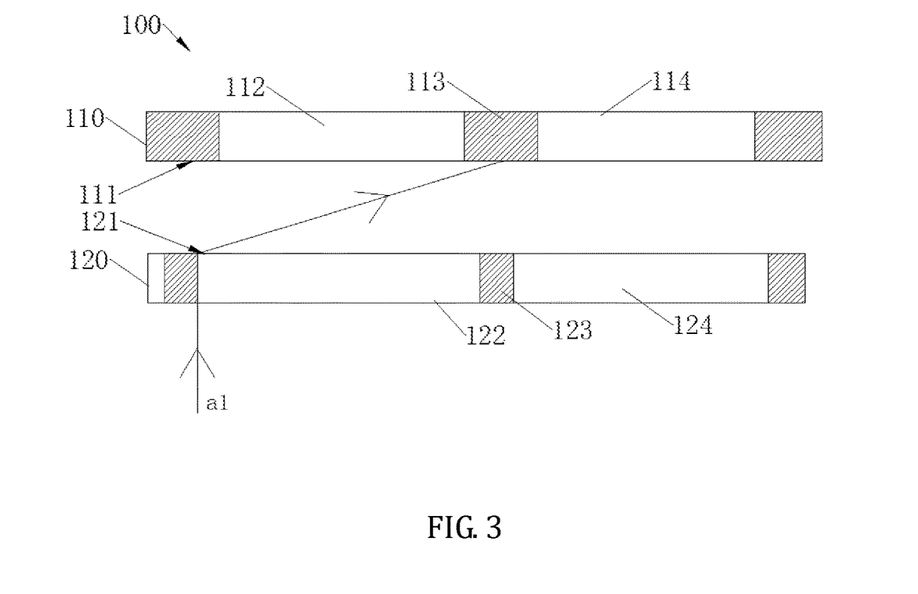
FIG. 3 is a schematic view illustrating another optical path provided in an embodiment of this application.
Figure 4:
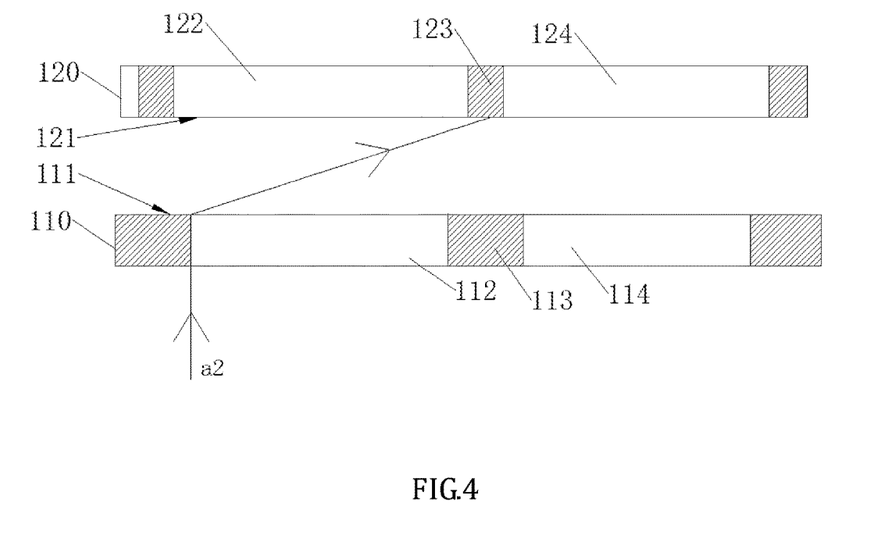
FIG. 4 is a schematic view illustrating a further optical path provided in an embodiment of this application.

Referring to FIGS. 3 and 4, FIGS. 3 and 4 are views showing part cross section of a display panel 100 provided according to an embodiment of this application. A first substrate 110 comprises a first top wall 111. The first top wall 111 comprises, consecutively connected, a first light transmission zone 112, a first light blocking zone 113, and a second light transmission zone 114. The first light transmission zone 112, the first light blocking zone 113, and the second light transmission zone 114 are arranged to distribute in a first direction x. The first direction x is a direction of a short edge of the color resist sub-pixel area. A second substrate 120 comprises a second top wall 121 that is opposite to the first top wall 111. The second top wall 121 comprises, consecutively connected, a third light transmission zone 122, a second light blocking zone 123, and a fourth light transmission zone 124. The third light transmission zone 122, the second light blocking zone 123, and the fourth light transmission zone 124 are arranged to distribute in the first direction x. The first light transmission zone 112 and the third light transmission zone 122 are arranged opposite to each other. The first light blocking zone 113 and the second light blocking zone 123 are arranged opposite to each other and a projection of the first light blocking zone 113 cast on the second substrate 120 has an area covering the second light blocking zone 123. The first light blocking zone 113 functions to block first light a1 from projecting onto the second light transmission zone 114 when the first light a1 is projecting onto the first light transmission zone 112. The second light blocking zone 123 functions to block second light a2 from projecting onto the fourth light transmission zone 124 when the second light a2 is projecting onto the third light transmission zone 122.

Optionally, the first substrate 110 is parallel to the second substrate 120, or alternatively, forms an angle that is smaller than or equal to 5° with respect to the second substrate 120. Preferably, the first substrate 110 is made parallel to the second substrate 120. The first light blocking zone 113 has a center line that is substantially coincident with a center line of the second light blocking zone 123.

Specifically, the first substrate 110 comprises a plurality of light transmission zones for transmission or emission of light, and a first light blocking zone 113 is arranged between adjacent ones of the light transmission zones for blocking light. The second substrate 120 also comprises a plurality of light transmission zones for transmission or emission of light, and a second light blocking zone 123 is arranged between adjacent ones of the light transmission zones for blocking light. In the instant embodiment, the light transmission zones of the first substrate 110 and the light transmission zones of the second substrate 120 correspond to each other one by on; and the first light blocking zone 113 of the first substrate 110 correspond to the second light blocking zone 123 of the second substrate 120, respectively. Specific differences between the first substrate 110 and the second substrate 120 will be described in details in the following example embodiments.

First Example Embodiment

Figure 5:
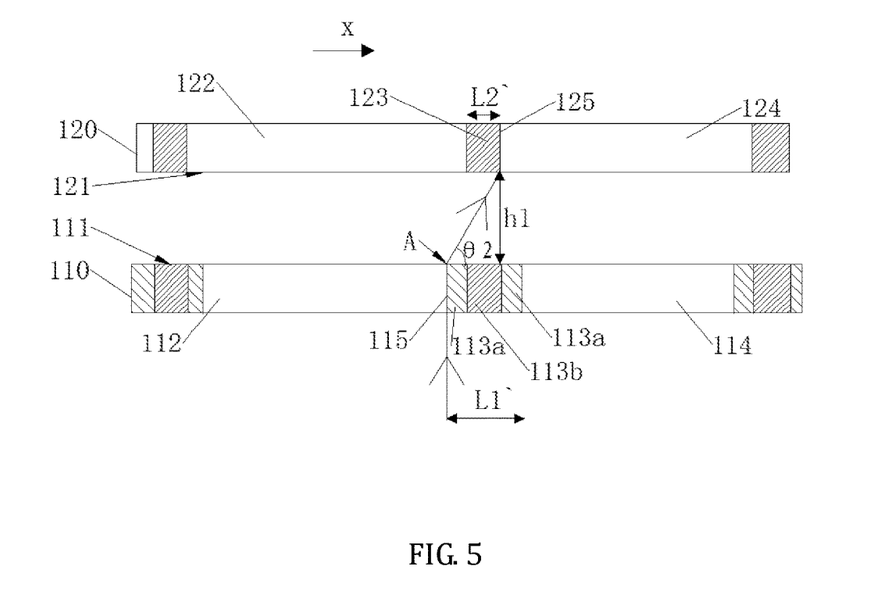
FIG. 5 is a schematic front view illustrating an optical path of a structure of a display panel provided in a first embodiment of the present invention.

Referring to FIG. 5, the first substrate 110 is made a thin-film transistor layer, and the second substrate 120 is made a color filter substrate. The backlight source 150 is arranged on one side of the thin-film transistor layer 110 that is distant from the color filter substrate 120. The backlight source 150 emits first light a1 transmitting through the third light transmission zone 122 to project onto the first light transmission zone 112. The first light transmission zone 112 and the second light transmission zone 114 are opening areas in the thin-film transistor layer 110 and the first light blocking zone 113 is a metal wiring area (including a thin-film transistor and metal wiring corresponding thereto). The third light transmission zone 122 and the fourth light transmission zone 124 are color resist sub-pixel areas and the second light blocking zone 123 is a black matrix.

Generally, the light transmission zones of the thin-film transistor layer 110 and the light transmission zones of the color filter substrate 120 are of approximately the same area. For easy description, calculation will be made on the basis of sizes measured in the first direction x. The light transmission zones of the thin-film transistor layer 110 and the light transmission zones of the color filter substrate 120 can both be 105 μm, and lengths of the first light blocking zone 113 and the second light blocking zone 123 in the first direction x are 40 μm. Based on the existing techniques, the embodiment of this application provides a solution to resolve the issue of cross talking of incident light by improving the size of a light transmission zone of the thin-film transistor layer 110 relative to a light transmission zone of the color filter substrate 12.

Optionally, the instant embodiment reduces the size of the light transmission zone of the thin-film transistor layer 110 to the size of the light transmission zone of the thin-film transistor layer 110 smaller than the size of the light transmission zone of the color filter substrate 120. In other words, the instant embodiment expands the size of the light blocking zone between the light transmission zones of the thin-film transistor layer 110 such that a projection of the first light blocking zone 113 cast on the color filter substrate 120 has an area covering the second light blocking zone 123, meaning the first light blocking zone 113 has a surface area that is far greater than a surface area of the second light blocking zone 123.

Optionally, various ways can be used to increase the size of the first light blocking zone between the light transmission zones of the thin-film transistor layer 110 and this application provides no constraint thereto.

Specifically, referring to FIG. 5, the first light blocking zone 113 comprises first metal wiring zones 113a and a third light blocking zone 113b. The third light blocking zones 113b are, respectively, arranged between the first metal wiring zone 113a and the first light transmission zone 112 and between the first metal wiring zone 113a and the second light transmission zone 114, wherein a projection of the second light blocking zone 123 cast on the thin-film transistor layer 110 may have an area that is substantially corresponding to an area of the first metal wiring zone 113a. The third light blocking zone 113b can be made of the same material as the second light blocking zone 123 and both can be a black matrix and made in the same manufacturing process.

Figure 6:
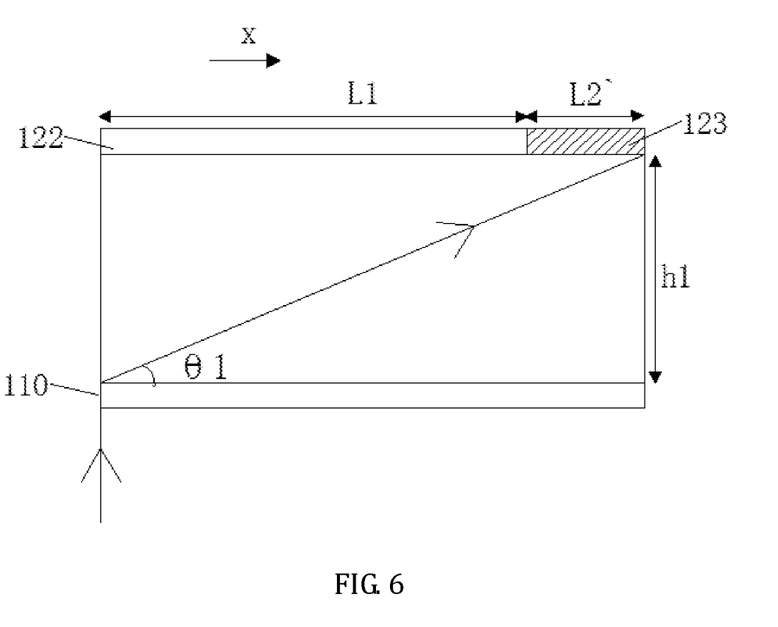
FIG. 6 is a schematic view illustrating yet a further optical path provided in an embodiment of this application.

This application provides no constraint to the increase of size of the first light blocking zone of the thin-film transistor layer 110. Optionally, the first light transmission zone 112, the first light blocking zone 113, and the second light transmission zone 114 are arranged to distribute in the first direction x; the first light blocking zone 113 has a length in the first direction x that is first length L1' and the second light blocking zone 123 has a length in the first direction x that is second length L2', a ratio between the first length L1' and the second length L2' being between 3:1 and 6:1. The ratio between the first length L1' and the second length L2' can be determined with the following calculation. Referring to FIG. 6, generally, a spacing distance between the first substrate 110 and the second substrate 120 is first spacing distance hi, and the first spacing distance hi can be 400 µm-700 µm. The length L1 of the third light transmission zone 122 in the first direction x is 105 um. The length L2' of the second light blocking zone 123 in the first direction x is 40 µm. A critical angle for light to project onto an adjacent color resist sub-pixel area is 90°−θ1=arctan(h1/(L1+L2')), which is between 11°-20°, and thus, θ1 is 70°-79°, so that incident light having an incident angle greater than 11° would get incident onto the second light transmission zone 114.

Referring to FIG. 5, an interfacing line between the first light blocking zone 113 and the first light transmission zone 112 is a first border 115, and an interfacing line between the second light blocking zone 123 and the fourth light transmission zone 124 is a second border 125. For light transmitting from the first light transmission zone 112 to get incident onto the second substrate 120, if incident light at the site of point A does suffer cross-talking with the fourth light transmission zone 124, then incident light at other sites would not cross-talk with the fourth light transmission zone 124. An angle between a connection line between the first border 115 and the second border 125 and the first top wall 111 is θ2. When the incident angle of the light (90°−θ2) is smaller than the critical angle for light incident onto an adjacent color resist sub-pixel area, the incident light at the site of point A does not cross-talk with the fourth light transmission zone 124. In other words, for the angle θ2 between the connection line between the first border 115 and the second border 125 and the first top wall 111 being smaller than or equal to 79°, the incident light at the site of point A does not cross-talk with the fourth light transmission zone 124. When θ2 is equal to 79°, the first spacing distance hi is 700 µm, and calculation determines the length of the first metal wiring zone 113b and the third light blocking zone 113a between the first metal wiring zone 113b and the first light transmission zone 112 is 105 µm, the first metal wiring zone 113b being 40 µm, so that the size of the first light blocking zone 113 is 105 µm+40 µm+105 µm=250 µm. In other words, a ratio between the areas of the second light blocking zone 123 and the first light blocking zone 113 is close to 6:1. Taking the aperture ratio of the thin-film transistor layer 110 into consideration, the surface area of the first light blocking zone 113 might be properly reduced so that the ratio of the areas of the first light blocking zone 113 and the second light blocking zone 123 may only be between 3:1 and 6:1.

Second Example Embodiment

Figure 7:
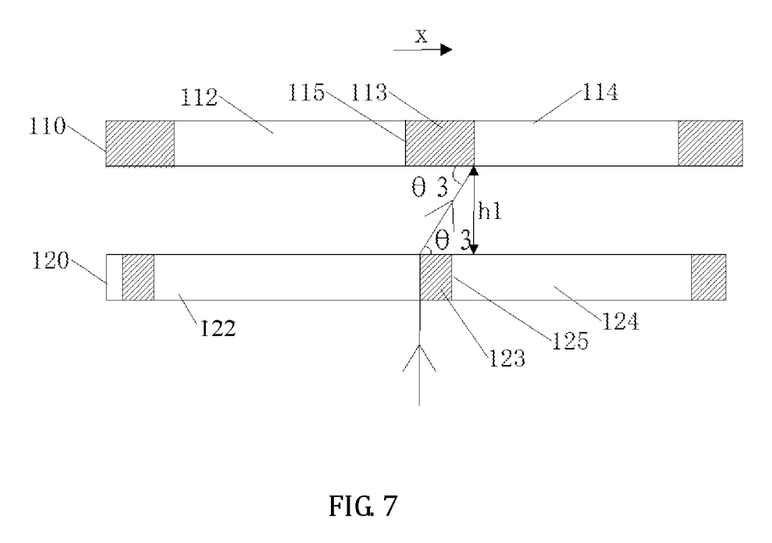
FIG. 7 is a schematic front view illustrating an optical path of a structure of a display panel provided in a second embodiment of the present invention.

Referring to FIG. 7, the first substrate 110 can alternatively be a color filter substrate and the second substrate 120 is a thin-film transistor layer. The display substrate may further comprises a backlight source 150, such that the backlight source 150 is arranged at one side of the thin-film transistor layer that is distant from the color filter substrate. The backlight source 150 emits second light a2 transmitting through the first light transmission zone 112 to project onto the third light transmission zone 122.

The first light transmission zone 112 and the second light transmission zone 114 can be color resist sub-pixel areas and the first light blocking zone 113 can be a black matrix. The third light transmission zone 122 and the fourth light transmission zone 124 can be opening areas in the thin-film transistor layer 120 and the second light blocking zone 123 is a second metal wiring zone, wherein a projection of the first light blocking zone 113 cast onto the second substrate 120 has an area covering the second metal wiring zone.

In the instant embodiment, a critical angle at which incident light projects onto other color resist sub-pixel areas is increased through increase of L by expanding the size of the first light blocking zone 113 (namely the black matrix).

Similar to the first embodiment, the instant embodiment makes a ratio between a length of the first light blocking zone 113 in the first direction x and a length of the second light blocking zone 123 in the first direction x a value between 3:1 and 6:1. An angle between a connection line between the first border 115 and the second border 125 and the first top wall 111 is θ3. For θ3 smaller than or equal to 79, incident light does not cross-talk with the second light transmission zone 114. Specific calculation is similar to that of the first embodiment and repeated description will be omitted herein.

In an embodiment of this application, the first light blocking zone 113 can be a black matrix, so that increasing the size of the first light blocking zone 113 could be such that the size of the black matrix is increased in a manufacturing process of the black matrix to make the size of the black matrix 3 to 6 times of the size of the second metal wiring zone of the thin-film transistor. This would make more incident light blocked by the black matrix without causing cross-talking with an adjacent color resist sub-pixel area.

The embodiment of this application provides discussion concerning the sizes of the first light blocking zone 113 and the second light blocking zone 123 in the first direction x, wherein the first direction x is the direction of a short edge of a color resist sub-pixel area. A relationship between the sizes of the first light blocking zone 113 and the second light blocking zone 123 in a direction of a long edge of the color resist sub-pixel area can be determined according to the inventive idea presented in this application and further description will not be necessary herein.

An embodiment of this application provides a display panel and a display terminal. The display panel is structured to reduce the size of the light transmission zone of the thin-film transistor layer or to increase the size of the light blocking zone of the color filter substrate in order to reduce issues of abnormality of image displaying caused by deviation of light from a corresponding color resist sub-pixel area, or even projection onto other color resist sub-pixel areas adjacent thereto, at the time when light transmits from the light transmission zone of the thin-film transistor layer to get incident onto the color filter substrate.

In summary, although the above disclosure provides the preferred embodiments of this application, the preferred embodiments are not intended to limit this application. For those having ordinary skills in the art, various changes and modifications are available without departing from the sprit and scope of this application. Thus, the scope of protection of this application is only determined by the appended claims.

What is claimed is:

1. A display panel, comprising a liquid crystal layer, a first substrate, and a second substrate, wherein the liquid crystal layer is arranged between the first substrate and the second substrate; the first substrate comprises, consecutively connected, a first light transmission zone, a first light blocking zone, and a second light transmission zone; the second substrate comprises, consecutively connected, a third light transmission zone, a second light blocking zone, and a fourth light transmission zone; the first light transmission zone and the third light transmission zone are arranged opposite to each other; the first light blocking zone and the second light blocking zone are arranged opposite to each other and a projection of the first light blocking zone cast on the second substrate has an area covering the second light blocking zone; the first light blocking zone functions to block, when first light is projected onto the first light transmission zone, the first light from projecting onto the second light transmission zone, and the second light blocking zone functions to block, when second light is projecting onto the third light transmission zone, the second light from projecting onto the fourth light transmission zone,
wherein the first substrate comprises a thin-film transistor layer and the second substrate comprises a color filter substrate, the first light blocking zone comprises two first metal wiring zones and a third light blocking zone directly contacts with the two first metal wiring zones, the third light blocking zone being arranged between one of the two first metal wiring zones and the first light transmission zone and between the other one of the two first metal wiring zones and the second light transmission zone, and the third light blocking zone is formed of a material that is the same as a material of the second light blocking zone.

2. The display panel according to claim 1, wherein the first light blocking zone and the first light transmission zone have an interfacing line therebetween that defines a first border, and the second light blocking zone and the fourth light transmission zone have an interfacing line therebetween that defines a second border, a connection line between the first border and the second border and the first substrate defining therebetween an angle that is smaller than or equal to 79°.

3. The display panel according to claim 1, wherein the first light transmission zone, the first light blocking zone, and the second light transmission zone are arranged to distribute in a first direction, the first light blocking zone having a length in the first direction that is a first length, the second light blocking zone having a length in the first direction that is a second length, a ratio between the first length and the second length being between 3:1 and 6:1.

4. The display panel according to claim 1, wherein the first substrate is parallel to the second substrate or defines an angle that is smaller than or equal to 5° with respect to the second substrate.

5. A display device, comprising a display panel, the display panel comprising a liquid crystal layer, a first substrate, and a second substrate, wherein the liquid crystal layer is arranged between the first substrate and the second substrate; the first substrate comprises, consecutively connected, a first light transmission zone, a first light blocking zone, and a second light transmission zone; the second substrate comprises, consecutively connected, a third light transmission zone, a second light blocking zone, and a fourth light transmission zone; the first light transmission zone and the third light transmission zone are arranged opposite to each other; the first light blocking zone and the second light blocking zone are arranged opposite to each other and a projection of the first light blocking zone cast on the second substrate has an area covering the second light blocking zone; the first light blocking zone functions to block, when first light is projected onto the first light transmission zone, the first light from projecting onto the second light transmission zone, and the second light blocking zone functions to block, when second light is projecting onto the third light transmission zone, the second light from projecting onto the fourth light transmission zone,
wherein the first substrate comprises a thin-film transistor layer and the second substrate comprises a color filter substrate, the first light blocking zone comprises two first metal wiring zones and a third light blocking zone directly contacts with the two first metal wiring zones, the third light blocking zone being arranged between one of the two first metal wiring zones and the first light transmission zone and between the other one of the two first metal wiring zones and the second light transmission zone, and the third light blocking zone is formed of a material that is the same as a material of the second light blocking zone.

6. The display device according to claim 5, wherein the first light blocking zone and the first light transmission zone have an interfacing line therebetween that defines a first border, and the second light blocking zone and the fourth light transmission zone have an interfacing line therebetween that defines a second border, a connection line between the first border and the second border and the first substrate defining therebetween an angle that is smaller than or equal to 79°.

7. The display device according to claim 5, wherein the first light transmission zone, the first light blocking zone, and the second light transmission zone are arranged to distribute in a first direction, the first light blocking zone having a length in the first direction that is a first length, the second light blocking zone having a length in the first direction that is a second length, a ratio between the first length and the second length being between 3:1 and 6:1.

8. The display device according to claim 5, wherein the first substrate is parallel to the second substrate or defines an angle that is smaller than or equal to 5° with respect to the second substrate.

9. The display device according to claim 5, wherein the display device further comprising a backlight source, the backlight source being arranged at one side of the thin-film transistor layer that is distant from the color filter substrate, the backlight source emitting first light transmitting through the first light transmission zone to project onto the third light transmission zone.

* * * * *